United States Patent Office 2,971,820
Patented Feb. 14, 1961

2,971,820
PREPARATION OF CYANAMIDE
William R. Rolingson, Texas City, Tex., assignor to Monsanto Chemical Company, St. Louis, Mo., a corporation of Delaware
No Drawing. Filed Sept. 22, 1958, Ser. No. 762,256
7 Claims. (Cl. 23—190)

The present invention relates to a new method for the preparation of cyanamide.

It has now been found that cyanamide can be prepared by heating together hydrogen cyanide and ammonia in contact with an inorganic, heat-stable, highly porous adsorbent of high surface area such as activated alumina or silica gel at a temperature of at least 400° C. at or slightly above atmospheric pressure. The cyanamide is formed on the surface of the adsorbent catalyst from which it may be recovered by conventional techniques such as leaching with water, for example.

The following examples illustrate the invention but are not to be construed as limiting it in any manner whatsoever.

Example 1

A quartz tube about 30 in. long and approximately 1 in. in diameter was employed as the reactor. A bed of catalyst consisting of activated alumina in pellet form about 2 in. in depth (15 g.) was supported within the reactor on a circular porous quartz plate located at about the midpoint of the tube. The reactor was heated by means of resistance wire wrapping covered by the necessary insulation. Temperatures in the tube and catalyst bed were recorded by means of a sliding iron-constantan thermocouple inserted in a quartz thermowell which extended through the catalyst bed.

The gaseous reactants, hydrogen cyanide and ammonia, were fed through flowmeters at rates of approximately 0.3 mol per hr. and 1.0 mol per hr., respectively, mixed in a glass manifold and then passed into the reactor and through the catalyst bed which was heated to a temperature of about 600° C. Pressure in the reactor was maintained at essentially atmospheric. Total reaction time was about 30 minutes. At the end of this time, the reactor was cooled and the catalyst mass was removed and slurried in hot water to extract the cyanamide formed as an aqueous solution. The mixture was filtered and the pH of the filtrate was adjusted to about 4 by the addition of nitric acid. Aqueous silver nitrate was then added to the filtrate to precipitate any cyanide present. The resulting mixture was then filtered and the pH of the filtrate was adjusted to 8.0 by the dropwise addition of ammonium hydroxide. This resulted in the precipitation of silver cyanamide as a bright yellow solid. After filtering, washing, and drying, the silver cyanamide was subjected to infrared analysis and positively identified as this compound by comparison of its infrared spectra with that of a known sample of silver cyanamide.

Example 2

The experiment of Example 1 was repeated at temperatures of 800° C. and 1000° C., respectively. Cyanamide was recovered from the catalyst after the manner described in Example 1 and positively identified as such in both runs.

Example 3

In this run, the catalyst bed in the reactor of Example 1 was of activated silica gel, 3-in. in depth. Hydrogen cyanide and ammonia were passed over the catalyst maintained at 500° C. at rates of 0.3 mol per hr. and 1.4 mol per hr. for approximately one-half hour. Cyanamide was recovered from the catalyst in the same manner as in Example 1 and similarly positively identified by infrared analysis.

The invention is not to be considered as limited to the specific conditions set forth in the examples since substantial variation may be made from these without departing from the scope of the invention. For example, some cyanamide is obtained at temperatures as low as 400° C. while the upper limit of the usable temperature range is dependent only upon the stability of the catalyst. Temperatures over 1000° C. may be used but these tend generally to cause disintegration of the catalyst. Preferably, the temperature is maintained in the range from about 550° to about 750° C.

Although the preferred catalyst is alumina, the catalyst can be any inorganic substance that provides a high surface area. Among such inorganic materials are, for example, fuller's earth, kieselguhr, celite, pumice, and the like.

The ratio of reactants may likewise vary. Equimolar quantities of the reactants may be used or, if desired, either reactant may be employed in excess. Generally, the ratio of HCN to $NH_3$ may vary from 1:20 to 20:1 but preferably this ratio is maintained within the range from 1:5 to 5:1.

The reaction occurs at atmospheric or substantially atmospheric pressure. Pressures slightly in excess of atmospheric such as those up to about 100 p.s.i. can be used, however.

Either a batch or continuous process is feasible. Other conditions being equal the yield of cyanamide varies with the reaction time in a fixed bed catalyst and is proportional to the weight of the catalyst. As the cyanamide forms and deposits on the catalyst, the catalyst decreases in activity. The most practical type of operation, from a commercial standpoint, therefore, appears to be a moving-bed type of catalyst or the use of a so-called fluidized catalyst technique. The product cyanamide may be readily recovered from the surface of the adsorbent catalyst by leaching with water as described or by other means well known to those skilled in the art.

What is claimed is:

1. The process of preparing cyanamide which comprises heating together hydrogen cyanide and ammonia in contact with an inorganic material of high surface area chosen from the group consisting of alumina, silica gel, fuller's earth, kieselguhr, celite and pumice at a temperature in the range from about 400° C. to about 1000° C. and at substantially atmospheric pressure.

2. The process of preparing cyanamide which comprises heating together hydrogen cyanide and ammonia in contact with an inorganic material of high surface area chosen from the group consisting of alumina, silica gel, fuller's earth, kieselguhr, celite and pumice at a temperature in the range from about 500° C. to about 750° C. at substantially atmospheric pressure.

3. The process of claim 1 wherein said inorganic material of high surface area is activated alumina.

4. The process of claim 1 wherein said inorganic material of high surface area is activated silica gel.

5. The process of claim 2 wherein said inorganic material of high surface area is activated alumina.

6. The process of claim 2 wherein said inorganic material of high surface area is activated silica gel.

7. The process of preparing cyanamide which comprises heating hydrogen cyanide and ammonia in a mole ratio in the range from about 1:5 to about 5:1 in the presence of activated alumina at a temperature of about 600° C. at substantially atmospheric pressure and recovering the thus-formed cyanamide.

References Cited in the file of this patent

UNITED STATES PATENTS 2,835,556    Boatright et al. _____ May 20, 1958